(12) United States Patent
Smith et al.

(10) Patent No.: US 7,020,146 B2
(45) Date of Patent: Mar. 28, 2006

(54) BROADCAST ARBITRATION IN A MULTI-DOMAIN DEVICE

(75) Inventors: Brian L. Smith, Sunnyvale, CA (US); Wayne Seltzer, San Jose, CA (US); Andrew Clayton, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1080 days.

(21) Appl. No.: 09/943,566

(22) Filed: Aug. 30, 2001

(65) Prior Publication Data

US 2003/0043843 A1 Mar. 6, 2003

(51) Int. Cl.
*H04L 12/28* (2006.01)

(52) U.S. Cl. ...................... 370/401; 709/249
(58) Field of Classification Search ............. 370/254, 370/401, 468, 477, 498, 442, 429, 412; 709/224
See application file for complete search history.

(56) References Cited

U.S. PATENT DOCUMENTS

| | | | |
|---|---|---|---|
| 5,179,669 A | | 1/1993 | Peters |
| 5,509,125 A | * | 4/1996 | Johnson et al. ............. 710/120 |
| 5,754,789 A | | 5/1998 | Nowatzyk et al. |
| 5,761,445 A | * | 6/1998 | Nguyen ....................... 710/100 |
| 5,784,373 A | | 7/1998 | Satake et al. |
| 5,883,895 A | | 3/1999 | Davis et al. |
| 5,991,302 A | | 11/1999 | Berl et al. |
| 6,901,056 B1 | * | 5/2005 | Smith et al. ................ 370/254 |

OTHER PUBLICATIONS

International Search Report—PCT/US 02/ 20197—Mailed Feb. 28,2003.

* cited by examiner

*Primary Examiner*—Dang Ton
*Assistant Examiner*—Salman Ahmed
(74) *Attorney, Agent, or Firm*—Meyertons Hood Kivlin Kowert & Goetzel, P.C.; Rory D. Rankin

(57) ABSTRACT

A method and mechanism for arbitrating and transmitting data. A first transaction and a second transaction are detected. The first transaction is targeted to a first domain and the second transaction is targeted to a second domain different than the first domain. Subsequent to receiving the transactions, arbitration domains corresponding to each are determined. In response to detecting the arbitration domains are not equal, the first and second transaction may be transmitted concurrently. However, if the arbitration domains are determined to be equal, arbitration is performed and transmission of the first and second transactions is serialized. Also contemplated is generating masks corresponding to each of the received transactions. The masks which are generated include an indication of the target domain of the corresponding transaction. When the transaction is conveyed to a port for transmittal, its mask is conveyed as well. Each port includes a domain vector register indicating the domains to which it is connected. By comparing the received mask to the domain vector register, a determination is made as to whether the transaction is to be output on the port or not.

38 Claims, 12 Drawing Sheets

| NODE | OBSERVABILITY DOMAINS | |
|---|---|---|
| 101 | A    B | — 302 |
| 102 | C | — 304 |
| 103 | B    C | — 306 |
| 104 | B | — 308 |
| 106 | A | — 310 |
| 105 | D | — 312 |

*Fig. 3*

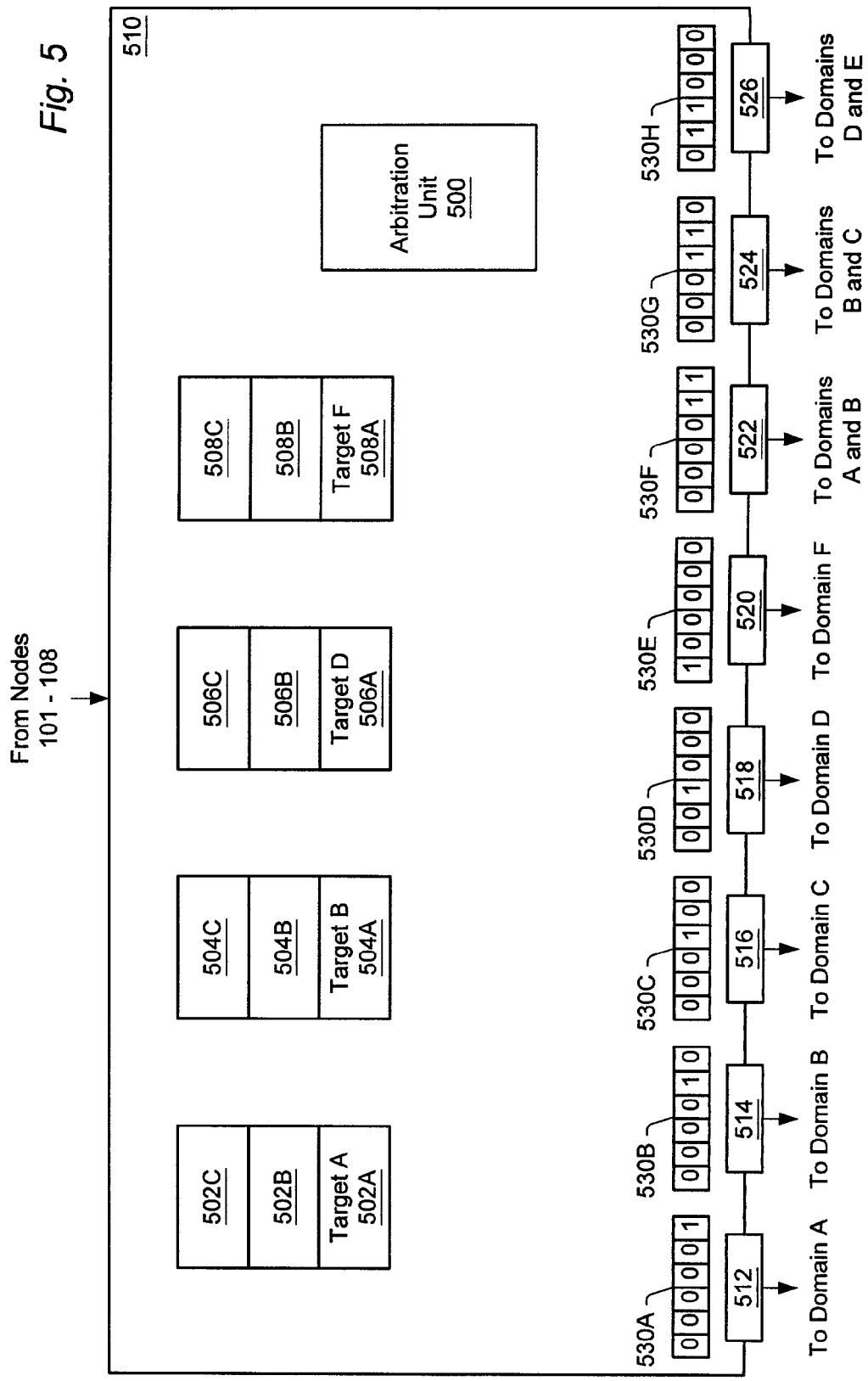

| DOMAINS 720 | NODES 722 | ARBITRATION DOMAIN 724 | PSEUDO DOMAIN 726 |
|---|---|---|---|
| A | 101, 106 | A B C | A |
| B | 101, 103, 104 | A B C | A |
| C | 102, 103 | A B C | A |
| D | 105, 107 | D E | D |
| E | 107 | D E | D |
| F | 108 | F | F |

*Fig. 7*

BROADCAST ARBITRATION IN A MULTI-DOMAIN DEVICE

BACKGROUND OF THE INVENTION

1. Field of the Invention

This invention is related to the field of digital communications and, more particularly, to the arbitration of communications in multiple domains.

2. Description of the Related Art

In the field of data communications, it is common to create communication networks among various devices in order to allow communication between those devices. It is also common to structure such networks such that certain devices may communicate with some devices, but not others. For example, an enterprise network may include a server which is configured with several processors for servicing the needs of a bank. The bank being serviced may have a production community which includes persons who are involved in the day to day workings of the bank. In addition, a bank may have a development community which includes persons working to develop and test new banking computer applications. Further, a bank may have a public web site which allows Internet users to obtain information or services related to the bank. Each of these user communities requires access to different sets of data which in some cases may be mutually exclusive.

In an enterprise network, some computing resources may be dedicated to users of a single community, and others may be shared among users of multiple communities. By partitioning resources, different domains may be created which provide for separation of these communities. Generally, communications within one domain are not visible to another domain. One purpose for using domains is to provide isolation. By isolating domains from one another, problems within one domain may be prevented from affecting other domains. Single domain devices are devices (e.g., processors, computers, networking equipment, etc.) processing information on behalf of users or processes in a single domain. However, in some cases, such as due to cost or technical constraints, it may be necessary or desirable to use a single device to serve multiple domains. Multi-domain devices are devices processing information on behalf of users or processes in more than one domain.

FIG. 1 is an illustration of one embodiment of a communication network 100. Included in FIG. 1 are nodes 101, 102, 103, 104, 105 and 106 coupled to a switch 110. Switch 110 is configured to route information between nodes 101, 102, 103, 104, 105 and 106. Each of nodes 101, 102, 103, 104, 105 and 106 may comprise one or more processors, workstations, networks, or other computing resources. Consequently, communication network 100 may comprise a single board with multiple processors, a local area network, or otherwise. In the embodiment of FIG. 1, resources have been partitioned to create four domains, A, B, C and D. Domain A 120 includes nodes 101 and 106. Domain B 130 includes nodes 101, 103 and 104. Domain C 140 includes nodes 102 and 103. Domain D includes node 105. In general, all communications broadcast within a domain are visible to all members of that domain and not visible to members outside that domain. In general, a domain is a group of clients which operate as a logical computer system. Consequently, all communications broadcast by node 101 within domain A 120 are visible to nodes 101 and 106, and vice-versa. Similarly, all communications broadcast by node 104 within domain B 130 are visible to nodes 101, 103 and 104. However, because node 106 is part of domain A 120 and node 104 is part of domain B 130, broadcasts from either of nodes 104 or 106 are not visible to the other. Further, because node 105 is the only member of domain D 150, broadcasts by node 105 within domain D 150 are only visible to node 105. Consequently, nodes 102, 104, 105 and 106 may be considered single-domain nodes and nodes 101 and 103 may be considered multi-domain nodes. In addition, because switch 110 is coupled to domain A 120, domain B 130, domain C 140, and domain D 150, switch 110 may be considered a multi-domain device.

Turning now to FIG. 2, one embodiment of switch 110 is shown. Included in the exemplary embodiment shown are queues 202, 204, 206 and 208 which are configured to store data received from nodes 101, 102, 103, 104, 105 and 106. Queue 202 includes entries 202A–202C, queue 204 includes entries 204A–204C, queue 206 includes entries 206A–206C, and queue 208 includes entries 208A–208C. Elements referred to herein with a particular reference number followed by a letter will be collectively referred to by the reference number alone. For example, queue entries 202A–202C will be collectively referred to as queue 202. While four queues are shown in the embodiment, any suitable type and number of storage device may be utilized. Also included in switch 110, are output ports 212, 214, 216, 218, 220 and 222. Port 212 is configured to convey data to domain A 120, port 214 is configured to convey data to domain B 130, port 216 is configured to convey data to domain C 140, port 218 is configured to convey data to domains A 120 and B 130, port 220 is configured to convey data to domains B 130 and C 140, and port 222 is configured to convey data to domain D.

In the example of FIG. 2, queue entry 202A contains data which is destined for domain A 120, queue entry 204A contains data destined for domain B 130, queue entry 206A contains data which is destined for domain C 130, and queue entry 208A contains data which is destined for domain D 150. In the configuration shown, each of queues 202–208 may convey data to one or more of ports 212–222 at the same time. Further, each of ports 212–222 is configured to convey data irrespective of whether or not another of ports 212–220 is presently conveying data. Consequently, each of ports 212–220 is configured to convey data simultaneously.

Because switch 110 is a multi-domain device, certain limitations must be imposed on what data may be transmitted by ports 212–220 at the same time. Generally speaking, For example, data in queue entry 202A is destined for domain A 120 and will be conveyed via ports 212 and 218. Also, data in queue entry 204A is destined for domain B 130 and will be conveyed via ports 214 and 218. However, because port 218 conveys data for both domains A 120 and B 130, data destined for domains A 120 and B 130 may not be conveyed simultaneously. Consequently, data destined for domain A 120 should be serialized with data destined for domain B 130. Similarly, port 220 is configured to convey data to domains B 130 and C 140. Consequently, data destined for domain B 130 should be serialized with data destined for domain C 140. However, because data destined for domain B 130 should also be serialized with data destined for domain A 120, data for domain C 140 should be serialized with data destined for domain A 120 as well. Finally, data destined for domain D 150 need not be serialized with data destined for other domains and may be conveyed concurrently with other transaction data.

Generally speaking, in order to ensure correct operation and ordering of transactions, all nodes within a domain should see broadcasts within the domain at the same time. Alternatively, all nodes within a domain should see all broadcasts within the domain in the same order. For example, if two transactions A and B are broadcast within a domain, then all nodes in the domain should see the transactions in the same order. To ensure data is delivered to domains in the appropriate order, multi-domain switch 110 may be configured to serialize transmission of all data by only conveying data from a single queue on a given cycle. For example, data may be conveyed in a serial manner by first conveying data from queue 202, then queue 204, then queue 206, then queue 208. However, because such a serialization approach does not account for data which may be conveyed concurrently, the overall effective bandwidth of the switch 110 may be reduced and system performance may be dramatically reduced.

What is desired is a method and mechanism for identifying and arbitrating amongst data which require an ordered relationship.

SUMMARY OF THE INVENTION

A method and mechanism are contemplated for arbitrating and transmitting data. A first transaction and a second transaction are received. The first transaction is targeted to a first domain and the second transaction is targeted to a second domain different than the first domain. Subsequent to receiving the transactions, arbitration domains corresponding to each are determined. In response to detecting the arbitration domains are not equal, the first and second transaction may be transmitted concurrently. However, if the arbitration domains are determined to be equal, arbitration must be performed and transmission of the first and second transactions is serialized. In one embodiment, a transaction is conveyed to all ports in a switch which are coupled to a domain included in the arbitration domain. Also contemplated is generating masks corresponding to each of the received transactions. The generated masks include an indication of the target domain of the corresponding transaction. When the transaction is conveyed to a port for transmittal, its mask is conveyed as well. Each port includes a domain vector register indicating the domains to which it is connected. By comparing the received mask to the domain vector register, a determination is made as to whether the transaction is to be output on the port or not. As an alternative to using masks and vector registers, a destination domain ID of a transaction may be conveyed to the port which is configured to determine whether the corresponding destination domain is coupled to that port. In addition to the above, it is also contemplated that a transaction may be conveyed to all ports for output which are coupled to any of the domains in the arbitration domain corresponding to the transaction. Ports receiving a transaction may then forward the transaction only if the destination domain of the transaction is coupled to that port.

BRIEF DESCRIPTION OF THE DRAWINGS

Other objects and advantages of the invention will become apparent upon reading the following detailed description and upon reference to the accompanying drawings in which:

FIG. 3 illustrates one embodiment of a lookup table.

FIG. 5 is a block diagram of one embodiment of a switch.

FIG. 7 illustrates one embodiment of a lookup table.

Figure 1:
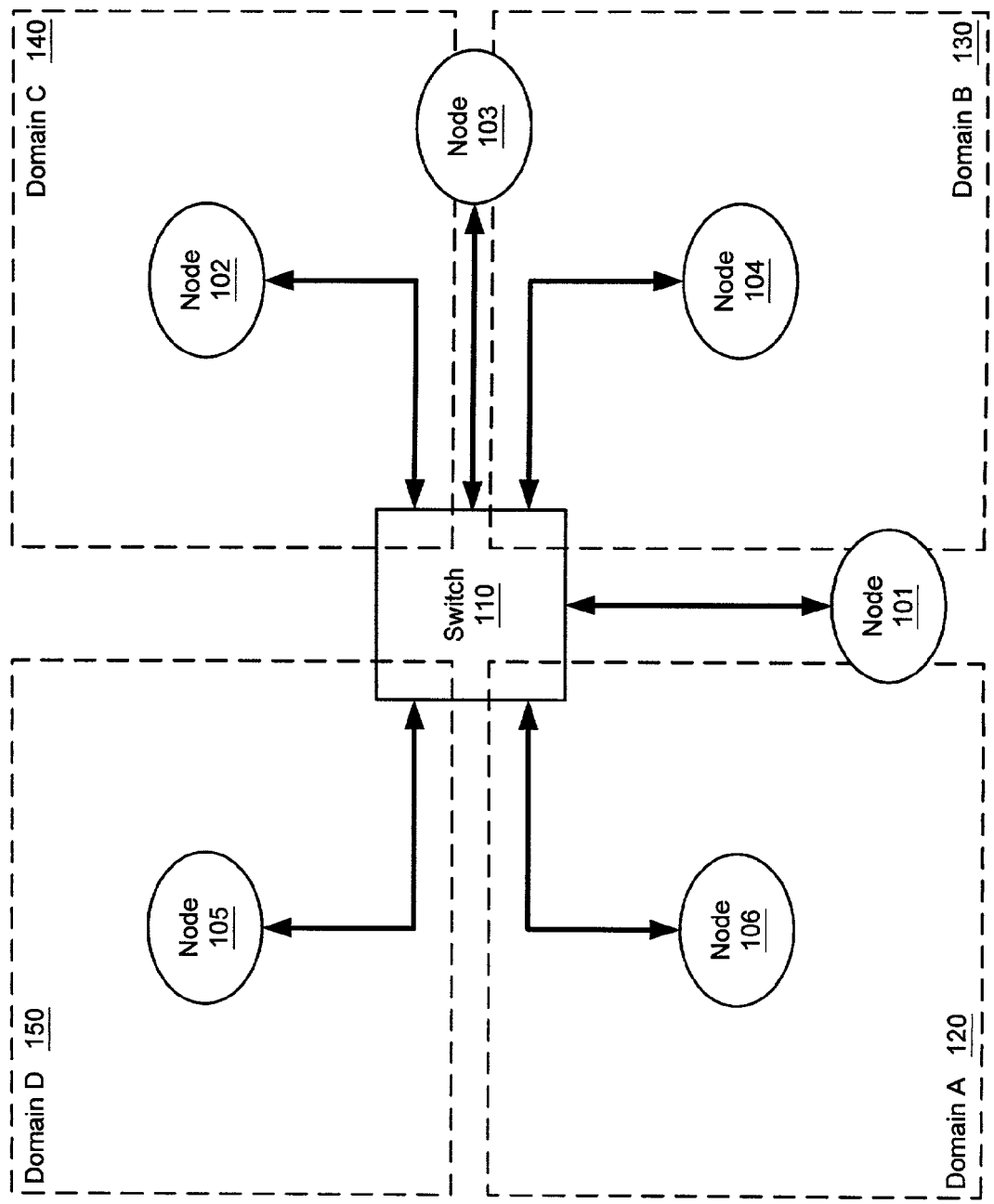
FIG. 1 is a diagram of one embodiment of a communication network.
Figure 2:
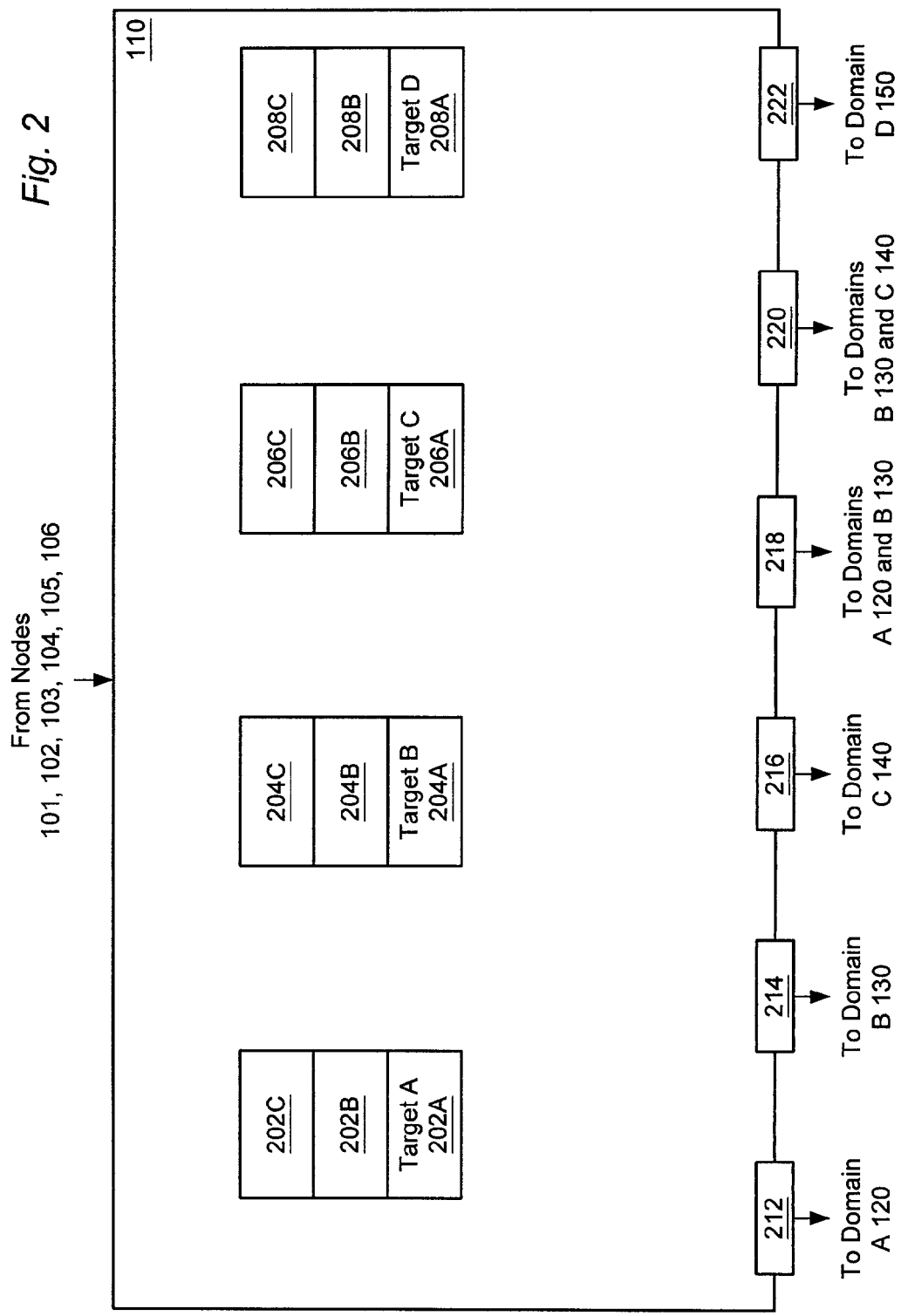
FIG. 2 is a block diagram of one embodiment of a switch.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Arbitration Domains

As discussed above, devices which serve or are members of multiple domains may require an arbitration mechanism to order transactions which require ordering. In the example above, a switch 110 was illustrated with ports coupled to multiple domains. Similarly, a multi-domain device coupled to receive transactions from multiple domains may have special requirements. For example, assume a node including a processor is coupled to domains D and E. The node is configured to see all broadcasts in both domains D and E. The "observability domain" of a node is the union of domains in which that node may observe broadcasts. Therefore, the observability domain of a node which is configured to see all broadcasts in domains D and E includes domains D and E. Typically, coherency protocols require strict ordering of transactions and/or simultaneous state transitions. Alternatively, communication protocols may be configured such that broadcast packets cause a processor interrupt. Consequently, a particular multi-domain processing node may be able to only process a broadcast from one domain at a time. Hence, having an effective arbitration mechanism in place may be essential.

In order to provide a mechanism to handle the above problems, two basic steps may be utilized. First, transactions which require ordering must be identified as such. Second, upon identifying two or more of such transactions, an ordering of such transactions must be established. In one embodiment, a virtual domain called an "arbitration domain" is defined which is used to identify transactions which must be ordered with respect to one another. FIG. 3 is a table 300 illustrating nodes and their corresponding observability domains. The first row 302 of the table shows node 101 belongs to domains A and B. The second row 304 shows node 102 belongs to domain C. The third row 306 shows node 103 belongs to domains B and C. The fourth row 308 shows node 104 belongs to domain B. The fifth row shows node 106 belongs to domain A. Finally, the sixth row 312 shows node 105 belongs to domain D.

Table 300 shows that each of nodes 101 and 103 are multi-domain devices. As discussed above, each node is coupled to see all broadcasts in its corresponding domains. Consequently, node 101 sees all broadcasts in domains A and B. Further, as described above, as node 101 is coupled to both domains A and B, transactions targeted to domain A must be serialized with transactions targeted to domain B. Similarly, because node 103 is coupled to both domains B and C, transactions targeted to domain B must be serialized with transactions targeted to domain C. Therefore, transactions within domains A, B and C must be serialized with one another and may be combined to form an "arbitration domain".

In general, all multi-domain devices which include a common domain may be used to form an arbitration domain. The resulting arbitration domain includes all domains which are coupled to the multi-domain devices. In the example of FIG. 3, multi-domain device 101 shares the domain B with multi-domain device 103. Consequently, all observability domains corresponding to node 101 (A and B) and all observability domains corresponding to node 103 (B and C) are combined to form an arbitration domain comprising domains A, B and C. Utilizing this virtual arbitration domain, transactions which must be ordered may be identified. In particular, two or more transactions which correspond to the same arbitration domain must be ordered with respect to one another.

In one embodiment, arbitration domains within a system may be identified and configured during system initialization. For example, a service processor coupled to the system may be used by a system administrator to configure switches and other devices within the system. In one embodiment, routing tables or other data structures within the system may be augmented to include arbitration domain related information. Other embodiments may utilize other data structures or devices.

Figure 3A:
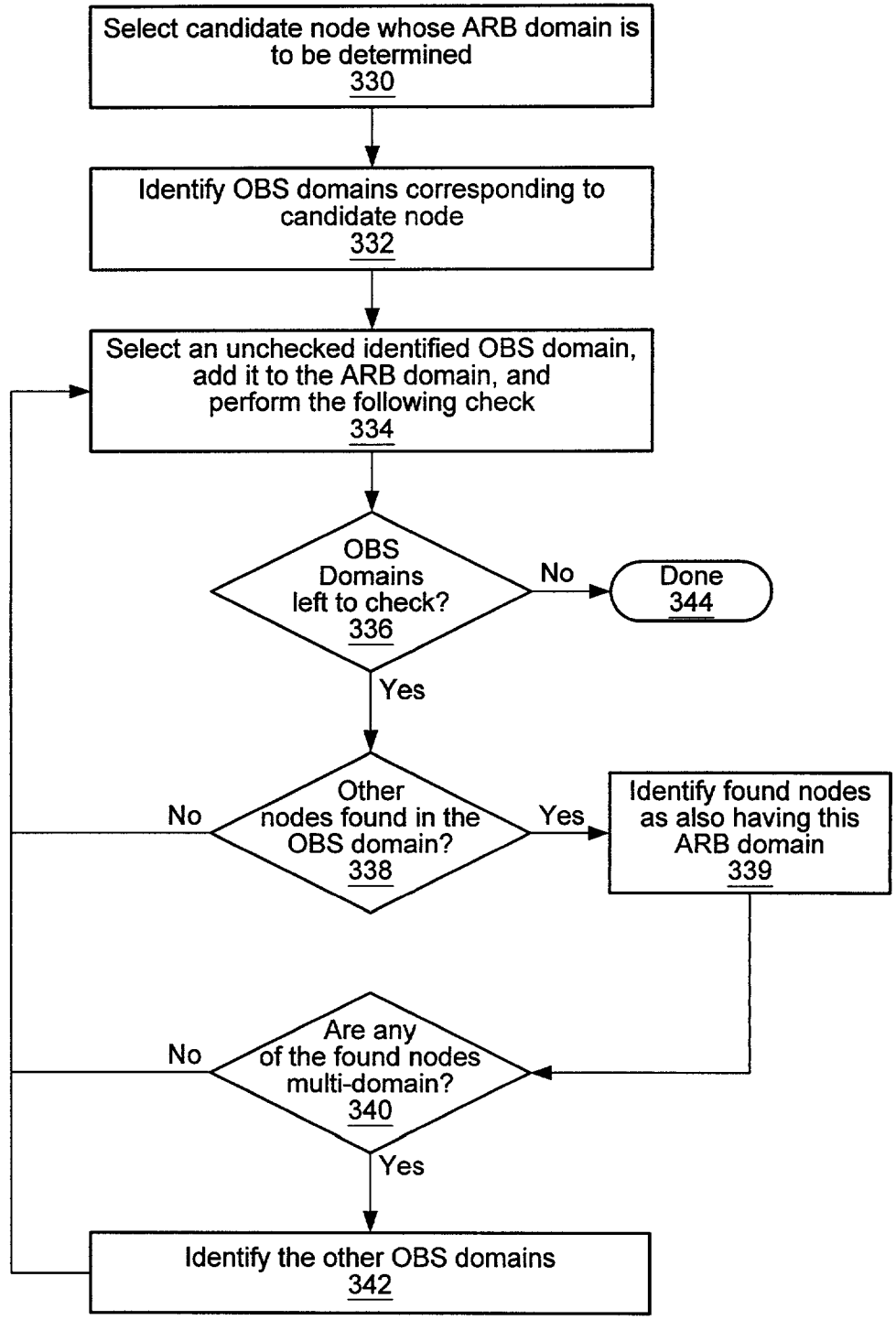
FIG. 3A if a flowchart illustrating one embodiment of a method for determining an arbitration domain.

FIG. 3A illustrates one embodiment of a method for determining an arbitration domain for a selected node. In the example shown, not only is the arbitration domain for a selected node determined, but all nodes which have that particular arbitration domain are identified as well. Consequently, determining the arbitration domain for one node will generally determine the arbitration domain for a number of other nodes as well.

In FIG. 3A, initially a "candidate" node is selected (block 330) whose arbitration (ARB) domain is to be determined. Subsequently, all observability (OBS) domains which correspond to the candidate node are identified (block 332). Then for each OBS domain identified, an iterative process may be used to build the arbitration ARB domain corresponding to the candidate node. First, one of the identified OBS domains which remains unchecked is selected, added to the ARB domain, and "checked", or processed (block 334). If there are no identified OBS domains remaining which are unchecked (block 336), then processing is complete (block 344). If there are OBS domains remaining which are unchecked (block 336), a determination is made as to whether there are other nodes which belong to the OBS domain currently under consideration (block 338). If no other nodes are found which belong to the OBS domain under consideration, processing returns to block 334. If other nodes are found which are members of the OBS domain under consideration (block 338), the found nodes are identified as nodes which also have the ARB domain which is being determined for the candidate node (block 339) and a determination is made as to whether any of the found nodes are members of more than one OBS domain (i.e., are multi-domain nodes) (block 340). If none of the other nodes are multi-domain nodes (block 340), processing returns to block 334. If any of the other nodes are members of other OBS domains as well, those other OBS domains are identified as OBS domains which require checking (block 342) and processing returns to block 334. Upon completion of the iterative process, the ARB domain for the candidate node is created. In addition, all other nodes which have this ARB domain are identified as well.

Figure 4:
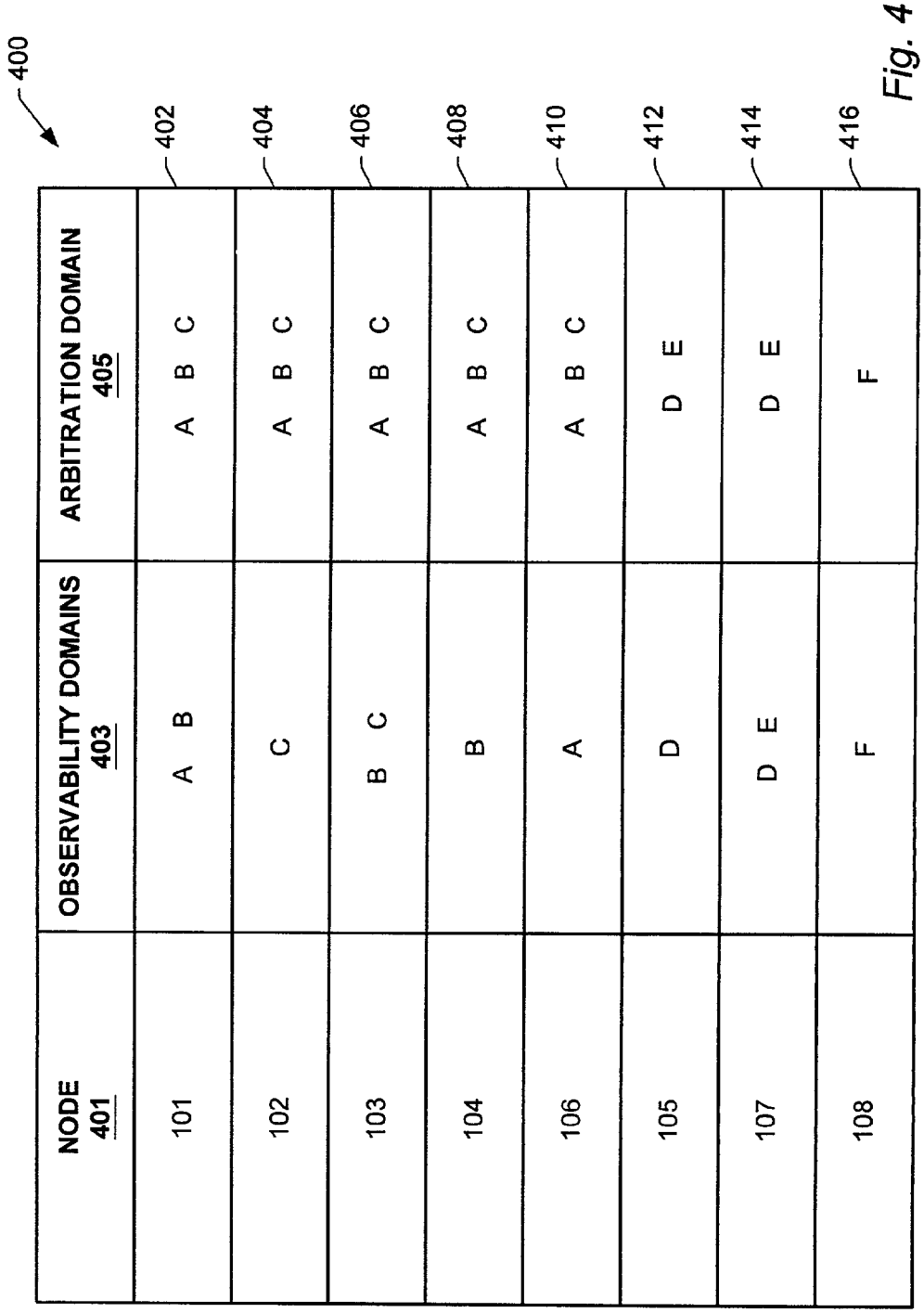
FIG. 4 illustrates one embodiment of a lookup table.

FIG. 4 illustrates one embodiment of how the above method may be used to determine arbitration domains. FIG. 4 shows a table 400 including three columns 401, 403 and 405. Table 400 is intended to be exemplary only and is used here for illustrative purposes. Column 401 identifies a particular node. Column 403 identifies the observability domains corresponding to a node. Column 405 identifies the arbitration domain corresponding to a node. In one embodiment, the observability domains corresponding to a node may be explicitly determined by making a node a member of those particular domains. This relationship between a node and the observability domains to which it belongs may typically be maintained in a table, database, or other structure within the system. This information may be utilized in determining corresponding arbitration domains. Also included in table 400 are rows 402–416, each corresponding to a different node.

Utilizing the above method, the arbitration domain corresponding to a node may be determined. Initially, the arbitration domains corresponding to a list of nodes 101–108 may be required. As an example, assume node 102 is selected (block 300) according to the above method. Domain C is then identified as the only observability domain corresponding to node 102 (block 332). Therefore domain C is added to the list of observability domains identified. Domain C is then selected for processing according to block 334 of the above method. Domain C is first added to the arbitration domain list. Because we still have unchecked domains (decision block 336), domain C, we move from block 336 to block 338 in the method. According to block 338 we determine if there are any other nodes which are members of domain C. Searching the table 400, we identify node 103 as being a member of observability domain C as well which is added to the list of nodes identified (block 339). We then determine if node 103 is a multi-domain node in block 340. Because node 103 is a member of observability domains B and C, node 103 is a multi-domain node and domain B is added to the list of observability domains identified (block 342). Returning to block 334, we select domain B for processing. Domain B is added to the arbitration domain list (block 334). Subsequently, table 400 is searched for other nodes which are members of domain B (block 338). Nodes 101 and 104 are both identified as being members of domain B and added to the list of identified nodes (block 339). Because node 101 is a member of domains A and B (block 340), domain A is added to the list of observability domains identified. Processing returns to block 334 where domain A is selected for processing. Domain A is added to the arbitration domain list. Node 106 is found to be a member of domain A as well. However, node 106 is not a multi-domain node and no other domains are added to the list of domains identified. Finally, no unchecked observability domains remain (block 336) and processing is done (block 344). Following the above processing, an arbitration domain including domains A, B and C has been identified as corresponding to the nodes 101–106 as shown in rows 402–410.

While arbitration domains may serve to identify transactions which are ordered with respect to one another, they also may be used identify transactions which may be transmitted concurrently. For example, using table 400 as a reference, given a first transaction targeted to domain A, a second transaction targeted to domain C, and a third transaction targeted to domain E, certain decisions regarding ordering may be made. Because the transactions targeted to domains A and C both correspond to the same arbitration domain, these transactions may not be transmitted concurrently and arbitration corresponding to those two transactions must be performed. In performing this arbitration, one transaction will be selected for transmittal prior to the other. However, because the transaction targeted to domain E does not belong to the same arbitration domain as the other two transactions, this transaction may be transmitted without regard to the other transactions. Consequently, in one example, the transaction to domain A may be transmitted concurrently with the transaction to domain E. Subsequently, the transaction to domain C may be transmitted. Advantageously, only those transactions which require serialization are serialized.

Identifying Transaction Target Domains

In one embodiment, a lookup table may be utilized to identify domains corresponding to nodes and transactions. For example, a lookup table similar to that shown in FIGS. 3 and 4 may be maintained in a switch or other device which shows a relationship between a node and domains. In one embodiment, each node may have an ID or address. When a new node is added to a domain, a new entry is created in the table with the ID of the new node and the domains to which it corresponds. Based on the information in the lookup table, corresponding arbitration domains may be determined as described above. Various embodiments may include circuitry and/or software to determine the corresponding arbitration domains. Alternatively, arbitration domains may be entered in a table manually by a system administrator.

Utilizing such a lookup table, a switch may determine the target domain of a first transaction and the arbitration domain corresponding to that target domain. For example, assuming table 400 is maintained within a switch and the switch receives a transaction with a destination address corresponding to node 106. By referencing the lookup table, the switch may determine that node 106 belongs to domain A. Further, the switch may determine that domain A corresponds to the arbitration domain represented by domains A, B and C. Consequently, if the switch has other transactions pending which have an arbitration domain of A, B and C, the switch may order these other transactions with the first transaction. Also, the switch may determine that other transactions targeted to domains which do not have arbitration domains which correspond to the arbitration domain of the first transaction may be conveyed concurrently with the first transaction.

Turning now to FIG. 5, one embodiment of a switch 510 is shown. Switch 510 includes queues 502–508 and ports 512–526. In addition, switch 510 includes arbitration unit 500. Finally, each of ports 512–526 includes a corresponding domain vector register 530A–530H, respectively. While switch 510 is shown with queues 502–508, any suitable type of storage structure may be used. Further, while registers 530 are shown as external to arbitration unit 500, they may be included within arbitration unit 500.

In the embodiment of FIG. 5, registers 530 are configured to indicate the domains to which the corresponding ports are coupled. Each register 530 includes a bit for each domain to which the port may be coupled. In the example shown, each register includes six bits, each bit corresponding to one of domain A–F. If a bit in a register is set to a binary value of "1", the corresponding port is coupled to convey data to the corresponding domain. If a bit in a register is set to a binary value of "0", the corresponding port is not coupled to convey data to the corresponding domain. As shown in FIG. 5, the rightmost bit of a register corresponds to domain A, the second bit from the right corresponds to domain B, the third bit from the right corresponds to domain C, the fourth bit from the right corresponds to domain D, the fifth bit from the right corresponds to domain E, and the sixth bit from the right corresponds to domain F. Consequently, register 530A has its rightmost bit set to indicate the corresponding port 512 is coupled to domain A. Register 530G has its second and third bits from the right set to indicate the corresponding port 524 is coupled to both domains B and C.

Arbitration

Generally speaking, arbitration unit 500 is configured to detect received data within queues 502–508 and determine which data may be conveyed concurrently and which data may not be conveyed concurrently. In one embodiment, arbitration unit 500 includes a lookup table similar to that of FIG. 4. Data which is at the head of a queue 502A, 504A, 506A, and 508A represents data which is ready for conveyance via ports 512–526. Arbitration unit 500 is configured to detect data which is at the head of queues 502–508, determine a destination of the data, determine arbitration domains corresponding to each data, and convey the data to ports 512–526 for transmittal.

In the example of FIG. 5, data contained in queue entry 502A has a destination or target address corresponding to domain A. The data in entry 504A has a target address corresponding to domain B. The data in entry 506A has a target address corresponding to domain D. The data in entry 508A has a target address corresponding to domain F. Assuming the transactions within queues 502–508 correspond to the domains shown in the table of FIG. 4, domains A and B are members of an arbitration domain including domains A, B and C. Domain D is a member of an arbitration domain including domains D and E. Domain F is a member of an arbitration domain including only domain F. Upon determining data A 502A and data B 504A correspond to the same arbitration domain, arbitration unit 500 is configured to serialize transmission of data A 502A and data B 504A. Arbitration unit 500 may be configured to select either data A 502A or data B 504A for transmission first according to any suitable selection algorithm. Arbitration unit 500 is further configured to determine that neither data D 506A nor data F 508A share an arbitration domain with any other data in queue positions 502A–508A. Consequently, data D 506A and data F 508A may be conveyed concurrently with the other data currently in queue positions 502A–508A.

Based on the determinations made by arbitration unit 500 regarding arbitration domains, arbitration unit 500 is configured to convey data to ports 512–526 for transmittal. Assume for the purposes of this example that arbitration unit 500 selects data A 502A for transmittal prior to data B 504A. Consequently, arbitration unit 500 conveys data A 502A, data D 506A, and data F 508A for transmittal. Arbitration unit 500 is configured to convey data from queues 502–508 to all ports which are coupled to the arbitration domain corresponding to the data being transmitted. For example, data A 502A corresponds to an arbitration domain including domains A, B, and C. Therefore, data A 502A is conveyed to all ports which are coupled to any of domains A, B or C. In this case, data A 502A is conveyed to ports 512, 514, 516, 522 and 524. Data D 506A is conveyed to ports 518 and 526. Data F 508A is conveyed to port 520.

In addition to conveying the data from queues 502–508 to ports 512–526, arbitration unit 500 may also be configured to convey a mask with each data indicating the destination domain of the data. Consequently, data A 502A is conveyed with a mask indicating a destination of domain A. Data D 506A is conveyed with a mask indicating a destination domain of D, and data F 508A is conveyed with a mask indicating a destination domain of F. Each of ports 512–526 compare the mask corresponding to the received data to its domain vector register, 530A–530H. If a port determines a destination domain indicated by a mask is coupled to the port, then the data is transmitted. On the other hand, if the mask does not indicate a domain to which the port is coupled, the data is not transmitted.

In one embodiment, the mask conveyed with each data may comprise six bits corresponding to those of domain vector registers 530. Therefore, the mask conveyed with data A 502A may have a rightmost bit set to indicate a destination of domain A and the remaining bits cleared. Corresponding bits in a mask may then be compared to bits in the domain vector register to either enable or disable transmission of the data. If there is a bit set in the domain vector register which corresponds to the bit set in the mask, transmission of the data may be enabled. In the present example of FIG. 5, data A 502A is conveyed to ports 512, 514, 516, 522 and 524. The mask conveyed with data A 502A has a rightmost bit set to indicate a destination domain of A. Because only domain vector registers 530A and 530F have a corresponding rightmost bit set, data A 502A is only conveyed via ports 512 and 522. Ports 514, 516 and 524 may simply drive an idle packet. Similarly, data D 506A is conveyed to ports 518 and 526 with a mask which has its fourth from the right bit set to indicate a destination domain of D. Because both vector registers 530D and 530H have a corresponding bit set, data D 506A is driven out ports 518 and 526.

Figure 5A:
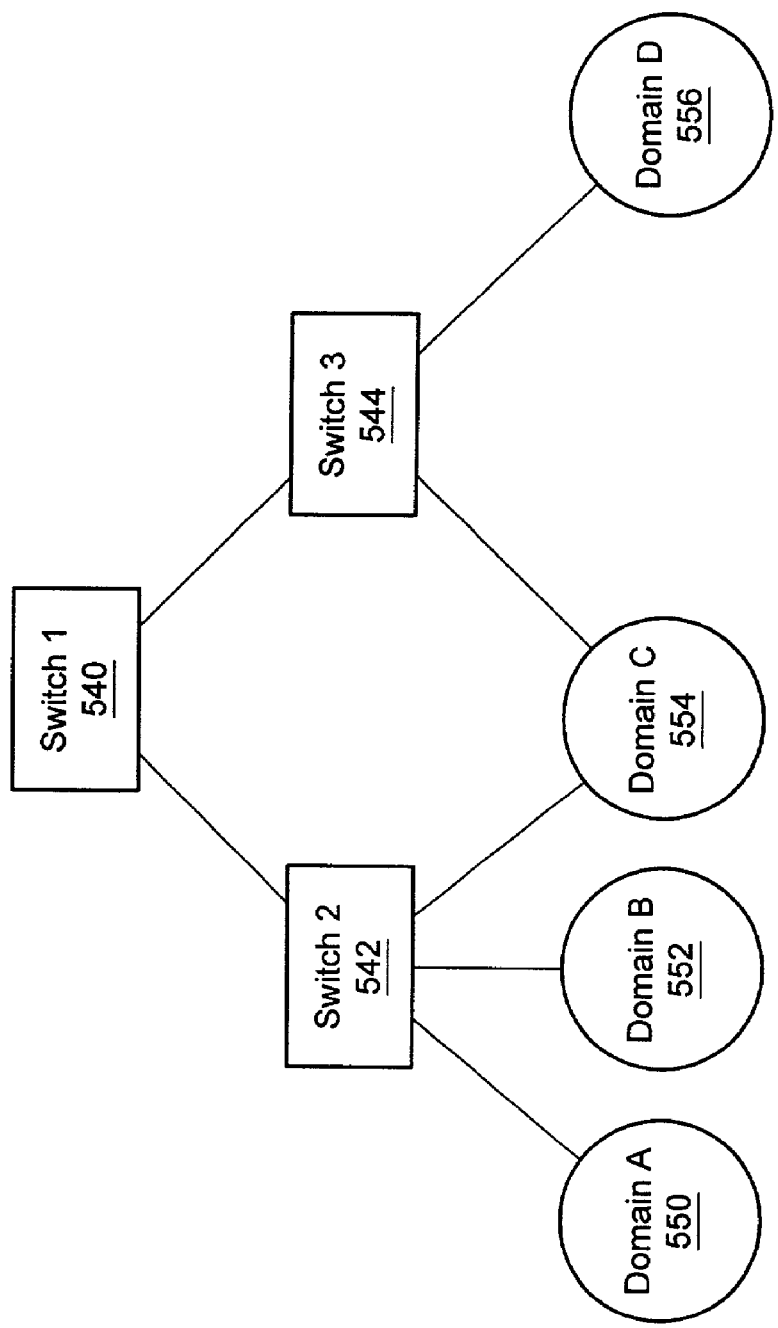
FIG. 5A illustrates one embodiment of a system.
Figure 5B:
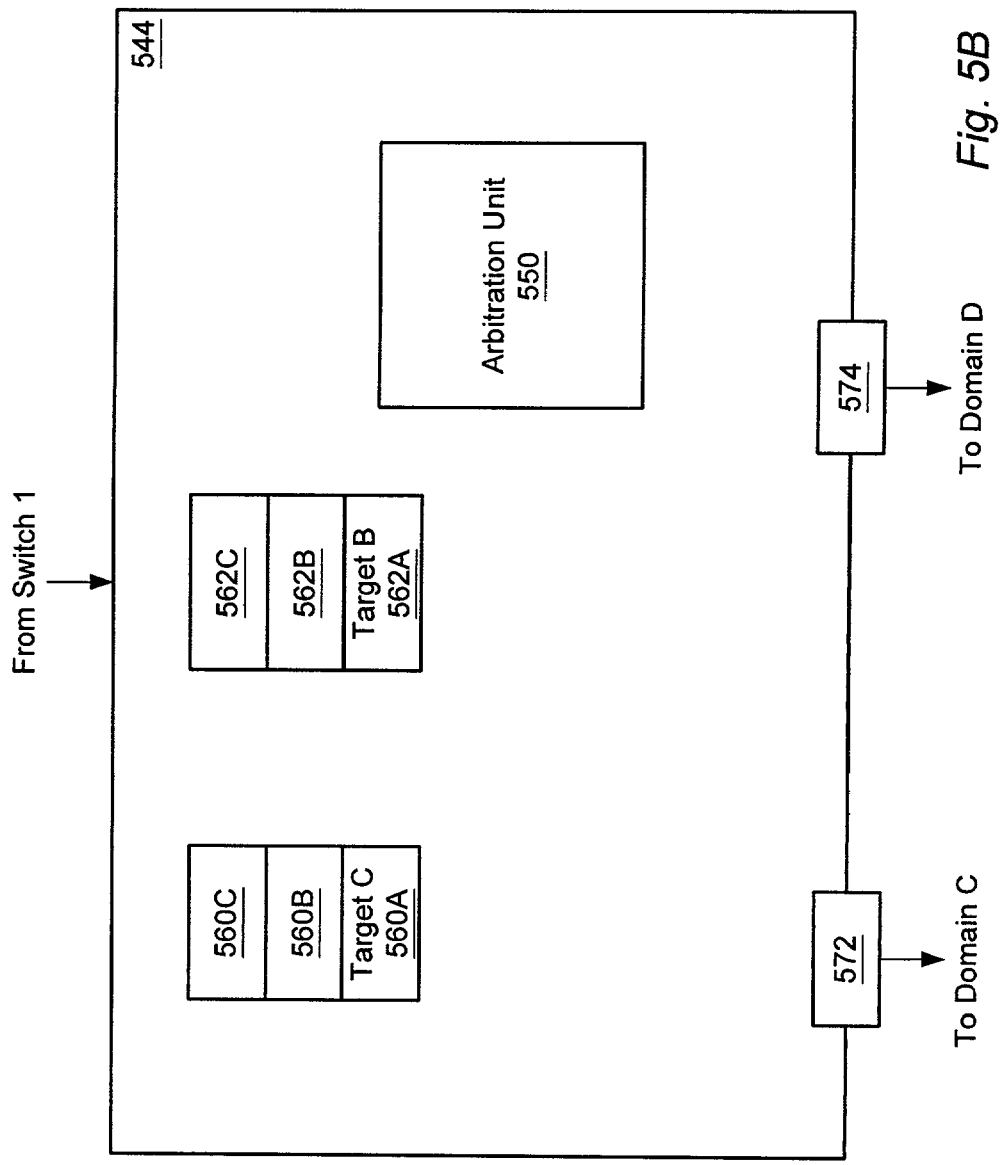
FIG. 5B illustrates one embodiment of a switch.

It should be noted that domain arbitration is to be performed for broadcast transactions in a switch even when the switch is not coupled to the target domain of the broadcast transaction. FIGS. 5A and 5B illustrate this case. FIG. 5A shows a system 590 including a hierarchy of switches, 540, 542, and 544. Switch 2 542 is coupled to domains A 550, B 552, and C 554. Switch 3 544 is coupled to domains C 554 and D 556. In the embodiment shown, broadcast transactions to any of the domains 550–556 will be seen by both switches 542 and 544. For example, if a node in domain B 552 broadcasts a transaction targeted to domain B 552, the broadcast transaction may be received by switch 2 542 which then conveys the transaction to switch 1 540. Switch 1 540 then conveys the broadcast transaction to both switch 2 542 and switch 3 544. Switch 3 544 receives the broadcast transaction which is targeted to domain B 552. However, switch 3 544 is not coupled to domain B 552. FIG. 5B illustrates an example of the state switch 3 544 may be in after receiving the broadcast transaction.

FIG. 5B shows a simplified block diagram of one embodiment of switch 3 544. Included in switch 3 544 are an arbitration unit 550, queues 560 and 562, and ports 572 and 574. As shown in FIG. 5B, the received broadcast transaction targeted to domain B 552 is in queue entry 562A. In the example shown, another broadcast transaction targeted to domain C 554 is in queue entry 560A. Because switch 554 is not coupled to domain B 552, a false assumption may arise in which it is assumed that the transaction in entry 560A may be transmitted without regard to the transaction targeted to domain B 552 in entry 562A. However, even though switch 554 is not coupled to domain B 552, domain arbitration is still performed between the transactions in both entries 560A and 562A. In this manner, consistency is maintained for all broadcasts in system 590. In the embodiment shown in FIG. 5B, an idle packet may be transmitted for the transaction being broadcast to domain B 552.

Figure 6:
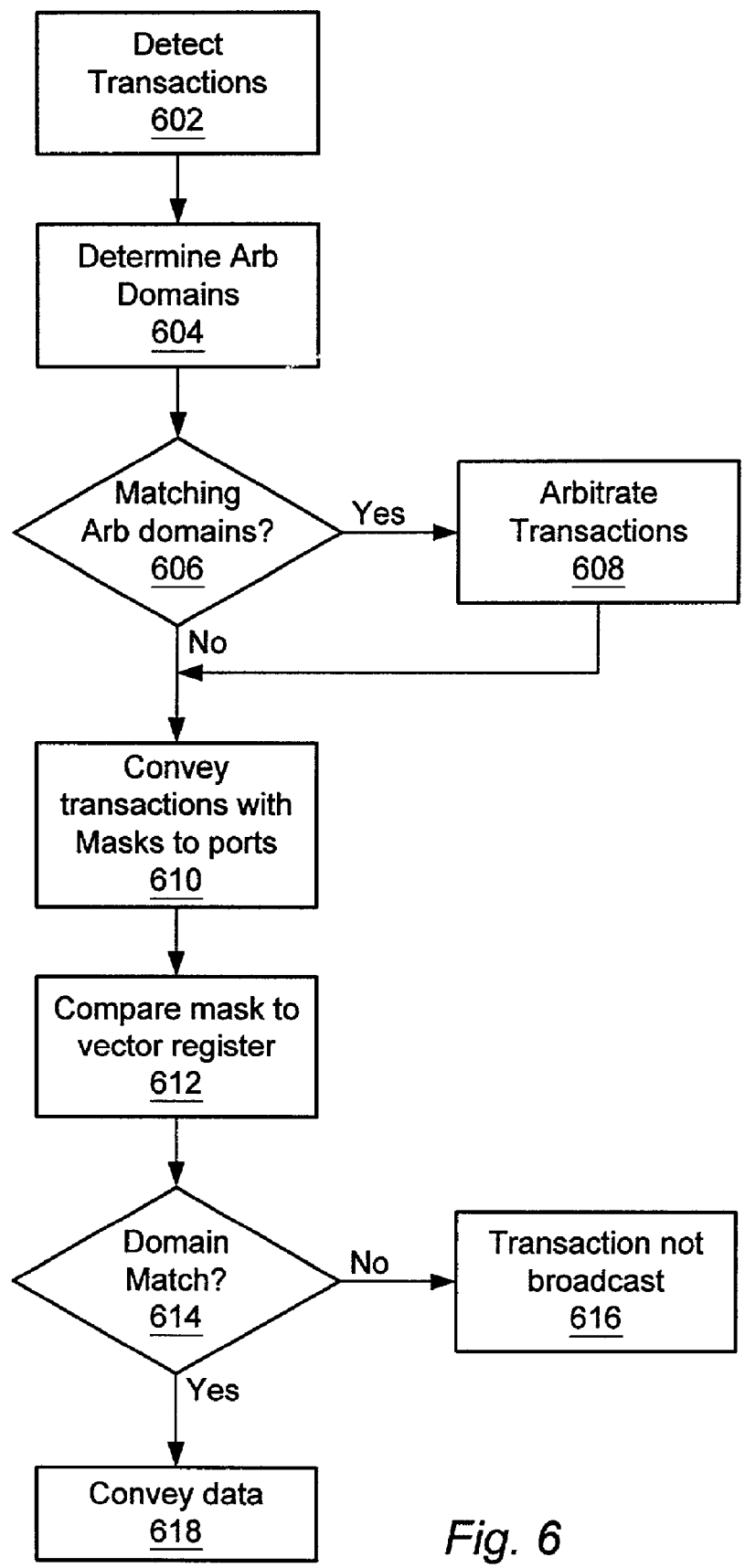
FIG. 6 is a flowchart illustrating one embodiment of a method for arbitration and transmittal.

FIG. 6 illustrates one embodiment of a method for arbitration and transmittal. Initially, transactions are detected (block 602) which are ready for transmittal. Subsequently, arbitration domains corresponding to the detected transactions are identified (block 604). If two or more of the transactions have matching arbitration domains (block 606), arbitration is performed to select one of the transactions for conveyance (block 608). If no transactions have matching arbitration domains, or subsequent to arbitration (block 608), selected transactions and masks are conveyed to output ports (block 610). Each transaction selected is conveyed to all ports which are coupled to domains included in the arbitration domain of the corresponding transaction. Selected transactions will generally include those transactions winning arbitration and/or transactions with no arbitration domains matching other transactions. Each selected transaction is conveyed with a mask indicating the domain to which the transaction is targeted. Subsequently, the transaction masks are compared to the domain vector register of the port to which is was conveyed (block 612). If the mask indicates a target domain which matches an OBS domain indicated by the domain vector register (block 614), the data is output on the port (block 618). On the other hand, if the mask indicates a target domain which does not match an OBS domain indicated by the domain vector register of the port, the transaction is not broadcast (block 616). When a transaction is not broadcast as indicated in block 616, various embodiment may include conveying an idle packet, conveying a point-to-point transaction, or otherwise.

As mentioned above, alternative embodiments may not utilize masks and domain vector registers. For example, in one embodiment, rather than conveying masks to ports, a destination domain ID may be conveyed with corresponding data to a port. Each port may then be configured to determine whether the port is coupled to the domain indicated by the domain ID. Such a determination may be performed by a table lookup, or any other suitable method. If the port is coupled to the destination domain, the transaction may be transmitted. Numerous alternatives are possible and are contemplated.

In one embodiment, arbitration unit 500 is configured to translate target domains of transactions in order to facilitate arbitration. FIG. 7 illustrates an alternative lookup table for use by arbitration unit 500. In the embodiment of FIG. 7, table 700 includes a separate row for each of domains A–F. Each row indicates the nodes 722 which are members of that domain, the arbitration domain 724 corresponding to that domain, and a pseudo domain 726 corresponding to that domain. The pseudo domain column 726 is used to translate the target domain of a transaction to a domain name for use in arbitration. A pseudo domain name is selected for each arbitration domain. Consequently, each domain 720 with a matching arbitration domain 724 will have the same pseudo domain 726. In the exemplary embodiment of FIG. 7, the pseudo domain name "A" has been arbitrarily selected to represent the arbitration domain "A B C". Similarly, the pseudo domain name "D" has been selected to represent the arbitration domain "D E".

Utilizing the pseudo domain name 726, transactions which may not be transmitted concurrently are readily identified. No two transactions with a same pseudo domain name 726 may be transmitted concurrently. For example, if arbitration unit 500 detects three transactions are ready for transmittal, arbitration unit 500 may use the target domain of the transaction to index into lookup table 700. If the three transactions have domain destinations of A, B and C, respectively, their pseudo domains are all "A". Consequently, the three transactions may not be transmitted concurrently and must be serialized. In one embodiment, transmittal of the three transactions may be scheduled in a round robin fashion (i.e., convey the transaction targeted to domain A in a first cycle, the transaction targeted to domain B in a second cycle, and the transaction targeted to domain C in a third cycle). Such a scheduling algorithm may serve to prevent starvation of any particular queue or resource. However, any suitable algorithm may be used.

Figure 8:
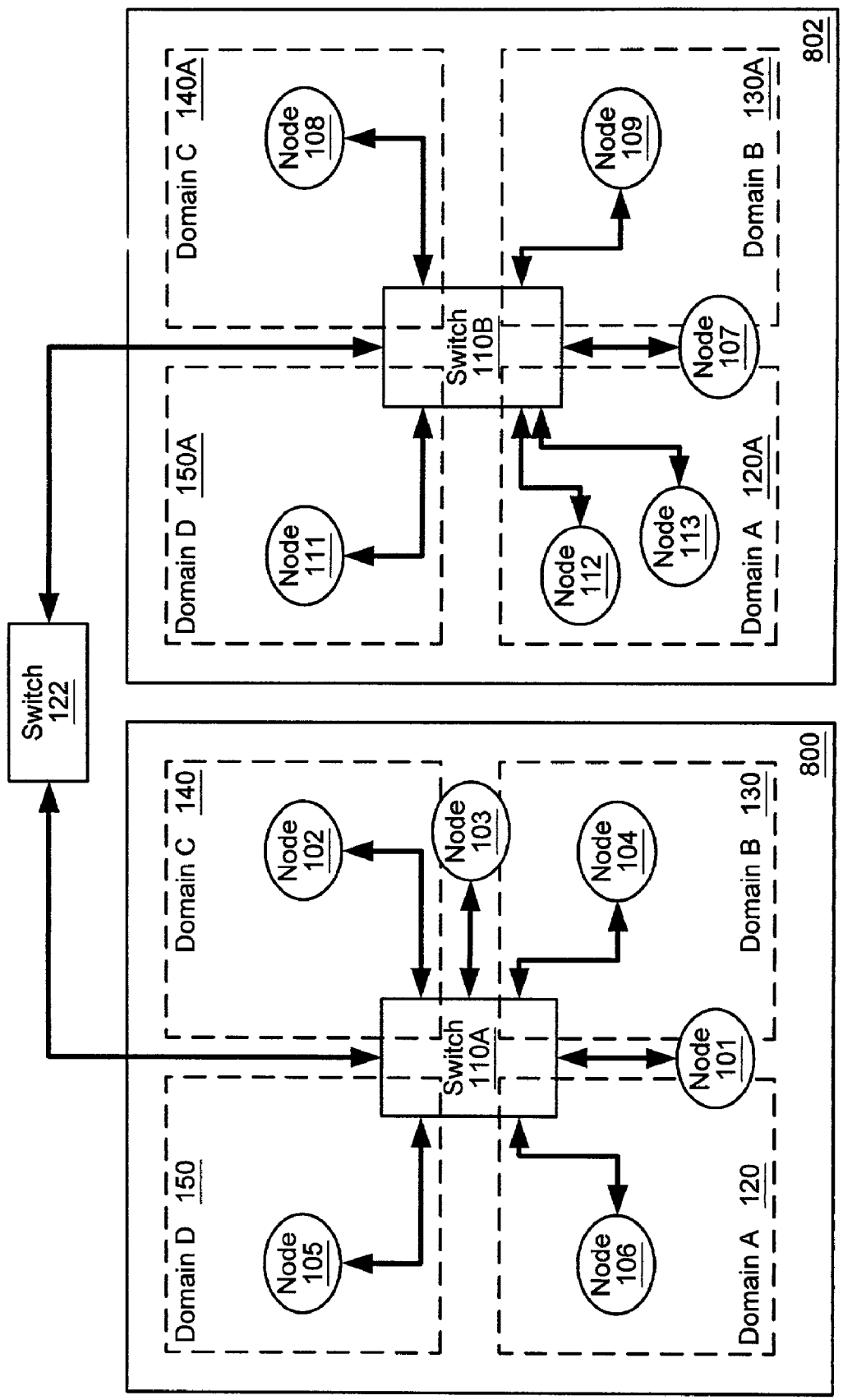
FIG. 8 illustrates one embodiment of a system utilizing a hierarchy of switches.

FIG. 8 illustrates one embodiment of a system in which a hierarchy of switches are used. A hierarchy of switches may be used when it is desired to provide communications between a larger number of nodes than a single switch can accommodate. Many other purposes for the use of a hierarchy of switches are possible and are contemplated. Three switches are shown in FIG. 8, switch 110A, switch 110B, and switch 122. The group 800 comprising switch 110A, nodes 101–106 and domains A 120, B 130, C 140, and D 150 is generally as described above, with the exception of switch 110A which is coupled to switch 122 in addition to nodes 101–106. Similarly, group 802 includes switch 110B coupled to nodes 107, 108, 109, 111, 112, 113, and switch 122. Each of switches 110A and 110B are configured to perform domain arbitration as described above.

In the exemplary embodiment shown in FIG. 8, each of domains A, B, C, and D include nodes in both groups 800 and 802. For example, domain A 120 and 120A includes nodes 101, 106, 107, 112 and 113. Similarly, domain D 150 and 150A includes nodes 105 and 111. Consequently, a broadcast within node D 150 and 150A will be seen by both nodes 105 and 111. In one embodiment, the arbitration domain method and mechanism are only performed at the first level switches, 110A and 110B. Switch 122 need not be configured to identify arbitration domains and perform the above described arbitration. In the embodiment shown, broadcast transactions received by switch 110A from nodes 101–106 are conveyed to switch 122. Similarly, broadcast transactions received by switch 110B are conveyed to switch 122. Switch 122 is configured to re-convey received broadcast transactions in the order they are received. For example, if switch 122 receives a first broadcast transaction targeted to domain D on a first clock cycle, and a second broadcast transaction targeted to domain D on a subsequent clock cycle, switch 122 will re-convey the first broadcast transactions followed by the second broadcast transaction. In this manner, switches 110 will receive broadcast transactions from switch 122 in the same order. In addition, switch 122 may be configured to convey corresponding broadcast transactions to switches 110A and 110B concurrently. In this manner, switches 110 may not only receive broadcast transactions in the same order, but at approximately the same time as well. Upon receiving a broadcast transaction from switch 122, each of switches 110 may then perform domain arbitration and transmit transactions as described above. Advantageously, a hierarchy of switches which accommodates a larger number of nodes and performs domain arbitration may be utilized.

Figure 9:
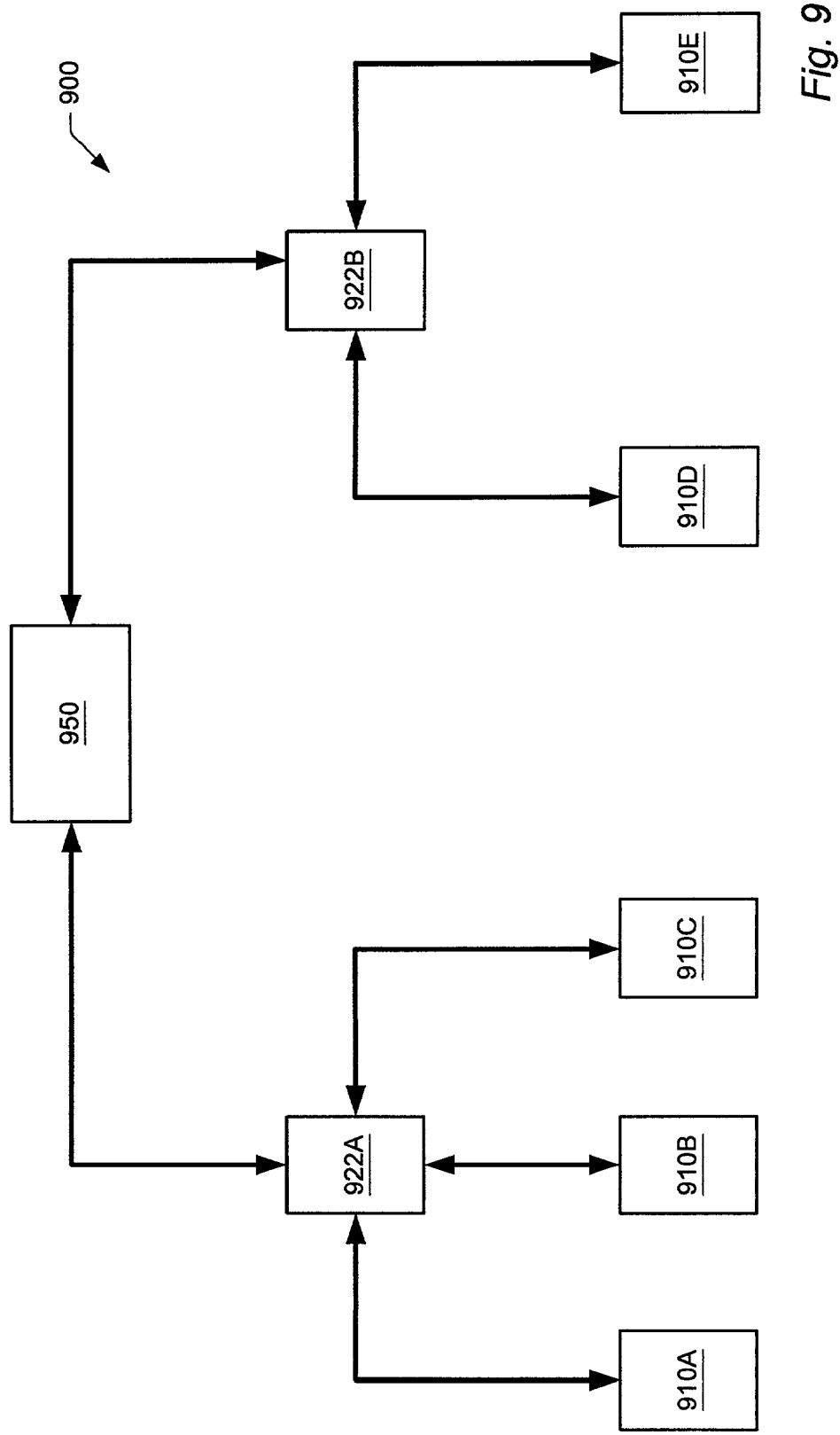
FIG. 9 illustrates one embodiment of a system utilizing a hierarchy of switches.

In general, when utilizing a hierarchy of switches, domain arbitration may be performed at only one level of hierarchy. However, numerous other configurations are possible and are contemplated, including configurations where switches at levels other than the first level, or switches at multiple levels, are configured to perform the arbitration as described herein. Still further, other embodiments may include a hierarchy of switches in which domain arbitration is performed at a first level of switches prior to conveying transactions to switches at a next level of hierarchy. For example, switches 110 may perform domain arbitration prior to conveying broadcast transactions to switch 122. In addition, while the example of FIG. 8 illustrates a hierarchy of two levels, any number of levels of hierarchy may be used. FIG. 9 is one example of a hierarchy of switches 900 including three levels of hierarchy. FIG. 9 includes switches 910A–910E which are coupled to switches 922A–922B, which are in turn coupled to switch 950. Switches 910 may be considered a first level of hierarchy, switches 922 may be considered a second level of hierarchy, and switch 950 may be considered a third level of hierarchy. In the exemplary embodiment of FIG. 9, each of switches 910 may be further coupled to one or more nodes in one or more domains. In one embodiment, broadcast transactions received by switches 910A and 910B from coupled nodes are conveyed to switches 922A and 922B, respectively. Broadcast transactions received by switches 922 are conveyed to switch 950. Switch 950 may then convey received broadcast transactions to switches 922, which then convey the transactions to switches 910. Switches 910 may then perform domain arbitration and transmit transactions as described above. As in the discussion of FIG. 8, various combinations of when domain arbitration may be performed and by what switches are possible.

It should be noted that while the above description describes the arbitration method and mechanism primarily in the context of multi-domain devices, the method and mechanism may be employed within single-domain devices as well. In some respects the single-domain device may be considered a degenerate case wherein all received broadcast transactions have the same arbitration domain. Consequently, the domain arbitration may serve as an ordering mechanism within single-domain devices as well.

Numerous variations and modifications will become apparent to those skilled in the art once the above disclosure is fully appreciated. It is intended that the following claims be interpreted to embrace all such variations and modifications.

What is claimed is:

1. A method for transmitting data comprising:
   receiving a first transaction targeted to a first domain;
   receiving a second transaction targeted to a second domain;
   determining a first arbitration domain corresponding to said first transaction;
   determining a second arbitration domain corresponding to said second transaction;
   transmitting said first and second transaction concurrently in response to detecting said first arbitration domain is not equal to said second arbitration domain; and
   serializing transmission of said first and second transaction in response to detecting said first arbitration domain equals said second arbitration domain.

2. The method of claim 1, further comprising:
   generating a first mask corresponding to said first transaction, wherein said first mask indicates said first domain; and
   generating a second mask corresponding to said second transaction, wherein said second mask indicates said second domain.

3. The method of claim 2, wherein transmitting said first and second transaction concurrently comprises:
   conveying said first transaction to a first port;
   conveying said second transaction to a second port;

transmitting said first transaction via said first port in response to detecting said first transaction is permitted to be conveyed via said first port; and transmitting said second transaction via said second port in response to detecting said second transaction is permitted to be conveyed via said second port.

4. The method of claim 3, wherein detecting said first transaction is permitted to be conveyed via said first port comprises comparing said first mask to a domain vector register of said first port, and wherein detecting said second transaction is permitted to be conveyed via said second port comprises comparing said second mask to a domain vector register of said second port.

5. The method of claim 4, wherein detecting said first transaction is permitted to be conveyed via said first port further comprises determining said domain vector register of said first port has a bit set which corresponds to a bit set in said first mask, and wherein detecting said second transaction is permitted to be conveyed via said second port further comprises determining said domain vector register of said second port has a bit set which corresponds to a bit set in said second mask.

6. The method of claim 5, wherein determining said first and second arbitration domain comprises querying a lookup table.

7. The method of claim 2, wherein a first port is coupled to said first domain and is not coupled to said second domain, and a second port is coupled to said first domain and said second domain, wherein serializing said first and second transaction comprises:

conveying said first transaction to said first port and said second port concurrently; and conveying said second transaction to said first port and said second port concurrently, wherein said second transaction is conveyed to said first port and said second port subsequent to conveying said first transaction to said first port and said second port.

8. The method of claim 7, further comprising:

transmitting said first transaction via said first port in response to detecting said first transaction is permitted to be transmitted via said first port;

transmitting said first transaction via said second port in response to detecting said first transaction is permitted to be transmitted via said second port;

transmitting said second transaction via said first port in response to detecting said second transaction is permitted to be transmitted via said first port; and transmitting said second transaction via said second port in response to detecting said second transaction is permitted to be transmitted via said second port.

9. The method of claim 8, wherein detecting said first transaction is permitted to be conveyed via said first port comprises comparing said first mask to a domain vector register of said first port, and wherein detecting said first transaction is permitted to be conveyed via said second port comprises comparing said first mask to a domain vector register of said second port, and wherein detecting said second transaction is permitted to be conveyed via said first port comprises comparing said second mask to a domain vector register of said first port, and wherein detecting said second transaction is permitted to be conveyed via said second port comprises comparing said second mask to a domain vector register of said second port.

10. The method of claim 9, wherein detecting said first transaction is permitted to be conveyed via said first port further comprises determining said domain vector register of said first port has a bit set which corresponds to a bit set in said first mask, and wherein detecting said first transaction is permitted to be conveyed via said second port further comprises determining said domain vector register of said second port has a bit set which corresponds to a bit set in said first mask, and wherein said detecting said second transaction is permitted to be conveyed via said second port further comprises determining said domain vector register of said second port has a bit set which corresponds to a bit set in said second mask, and wherein said detecting said second transaction is permitted to be conveyed via said first port further comprises determining said domain vector register of said first port has a bit set which corresponds to a bit set in said second mask.

11. The method of claim 8, further comprising:

inhibiting transmission of said first transaction via said first port in response to detecting said first transaction is not permitted to be transmitted via said first port;

inhibiting transmission of said first transaction via said second port in response to detecting said first transaction is not permitted to be transmitted via said second port;

inhibiting transmission of said second transaction via said first port in response to detecting said second transaction is not permitted to be transmitted via said first port; and inhibiting transmission of said second transaction via said second port in response to detecting said second transaction is not permitted to be transmitted via said second port.

12. The method of claim 11, wherein determining said first and second arbitration domain comprises querying a lookup table.

13. The method of claim 1, wherein transmitting said first and second transaction concurrently comprises:

conveying said first transaction to a first port;

conveying said second transaction to a second port;

transmitting said first transaction via said first port in response to detecting an identifier corresponding to said first transaction indicates said first transaction is permitted to be conveyed via said first port; and transmitting said second transaction via said second port in response to detecting an identifier corresponding to said second transaction indicates said second transaction is permitted to be conveyed via said second port.

14. A switch comprising:

a first output port;

a second output port; and an arbitration unit configured to detect a first transaction targeted to a first domain and a second transaction targeted to a second domain, wherein said arbitration unit is configured to determine a first arbitration domain corresponding to said first transaction, and a second arbitration domain corresponding to said second transaction;

wherein said switch is configured to transmit said first and second transaction concurrently in response to detecting said first arbitration domain is not equal to said second arbitration domain, and wherein said switch is configured to transmit said first and second transaction serially in response to detecting said first arbitration domain equals said second arbitration domain.

15. The switch of claim 14, wherein said arbitration unit is further configured to:

generate a first mask corresponding to said first transaction, wherein said first mask indicates said first domain; and generate a second mask corresponding to said second transaction, wherein said second mask indicates said second destination domain.

16. The switch of claim 15, wherein in transmitting said first and second transaction concurrently said switch is configured to:
convey said first transaction to a first port;
convey said second transaction to a second port;
transmit said first transaction via said first port in response to detecting said first transaction is permitted to be conveyed via said first port; and
transmit said second transaction via said second port in response to detecting said second transaction is permitted to be conveyed via said second port.

17. The switch of claim 16, wherein detecting said first transaction is permitted to be conveyed via said first port comprises comparing said first mask to a domain vector register of said first port, and wherein detecting said second transaction is permitted to be conveyed via said second port comprises comparing said second mask to a domain vector register of said second port.

18. The switch of claim 17, wherein detecting said first transaction is permitted to be conveyed via said first port further comprises determining said domain vector register of said first port has a bit set which corresponds to a bit set in said first mask, and wherein said detecting said second transaction is permitted to be conveyed via said second port further comprises determining said domain vector register of said second port has a bit set which corresponds to a bit set in said second mask.

19. The switch of claim 18, wherein said arbitration unit is configured to determine said first and second arbitration domain by querying a lookup table.

20. The switch of claim 15, wherein a first port is coupled to said first domain and is not coupled to said second domain, and a second port is coupled to said first domain and said second domain, wherein said switch is configured to serialize said first and second transaction by:
conveying said first transaction to said first port and said second port concurrently; and
conveying said second transaction to said first port and said second port concurrently, wherein said second transaction is conveyed to said first port and said second port subsequent to conveying said first transaction to said first port and said second port.

21. The switch of claim 20, wherein subsequent to said conveying said first transaction to said first port and said conveying said second transaction to said second port, said switch is further configured to:
transmit said first transaction via said first port in response to detecting said first transaction is permitted to be transmitted via said first port;
transmit said first transaction via said second port in response to detecting said first transaction is permitted to be transmitted via said second port;
transmit said second transaction via said first port in response to detecting said second transaction is permitted to be transmitted via said first port; and
transmit said second transaction via said second port in response to detecting said second transaction is permitted to be transmitted via said second port.

22. The switch of claim 21, wherein detecting said first transaction is permitted to be conveyed via said first port comprises comparing said first mask to a domain vector register of said first port, and wherein detecting said first transaction is permitted to be conveyed via said second port comprises comparing said first mask to a domain vector register of said second port, and wherein detecting said second transaction is permitted to be conveyed via said first port comprises comparing said second mask to a domain vector register of said first port, and wherein detecting said second transaction is permitted to be conveyed via said second port comprises comparing said second mask to a domain vector register of said second port.

23. The switch of claim 22, wherein detecting said first transaction is permitted to be conveyed via said first port further comprises determining said domain vector register of said first port has a bit set which corresponds to a bit set in said first mask, and wherein detecting said first transaction is permitted to be conveyed via said second port further comprises determining said domain vector register of said second port has a bit set which corresponds to a bit set in said first mask, and wherein said detecting said second transaction is permitted to be conveyed via said second port further comprises determining said domain vector register of said second port has a bit set which corresponds to a bit set in said second mask, and wherein said detecting said second transaction is permitted to be conveyed via said first port further comprises determining said domain vector register of said first port has a bit set which corresponds to a bit set in said second mask.

24. The switch of claim 21, further comprising:
inhibiting transmission of said first transaction via said first port in response to detecting said first transaction is not permitted to be transmitted via said first port;
inhibiting transmission of said first transaction via said second port in response to detecting said first transaction is not permitted to be transmitted via said second port;
inhibiting transmission of said second transaction via said first port in response to detecting said second transaction is not permitted to be transmitted via said first port; and
inhibiting transmission of said second transaction via said second port in response to detecting said second transaction is not permitted to be transmitted via said second port.

25. The switch of claim 24, wherein said arbitration unit is configured to determine said first and second arbitration domain by querying a lookup table.

26. The switch of claim 14, wherein in order to transmit said first and second transaction concurrently said switch is configured to:
convey said first transaction to said first output port;
convey said second transaction to said second output port;
transmit said first transaction via said first output port in response to detecting an identifier corresponding to said first transaction indicates said first transaction is permitted to be conveyed via said first output port; and
transmit said second transaction via said second port in response to detecting an identifier corresponding to said second transaction indicates said second transaction is permitted to be conveyed via said second output port.

27. A system comprising:
a first node corresponding to a first domain;
a second node corresponding to a second domain; and
a switch coupled to said first node and said second node, wherein said switch is configured to:
detect a first transaction targeted to said first domain and a second transaction targeted to said second domain,
determine a first arbitration domain corresponding to said first transaction, and a second arbitration domain corresponding to said second transaction, transmit said first and second transactions concurrently in response to detecting said first arbitration domain is not equal to said second arbitration domain, and transmit said first and second transactions serially in response to detecting said first arbitration domain equals said second arbitration domain.

28. The system of claim 27, wherein said switch is further configured to:

generate a first mask corresponding to said first transaction, wherein said first mask indicates said first domain; and generate a second mask corresponding to said second transaction, wherein said second mask indicates said second destination domain.

29. The system of claim 28, wherein in transmitting said first and second transaction concurrently said switch is configured to:

convey said first transaction to a first port of said switch;

convey said second transaction to a second port of said switch;

transmit said first transaction via said first port in response to detecting said first transaction is permitted to be conveyed via said first port; and transmit said second transaction via said second port in response to detecting said second transaction is permitted to be conveyed via said second port.

30. The system of claim 29, wherein detecting said first transaction is permitted to be conveyed via said first port comprises comparing said first mask to a domain vector register of said first port, and wherein detecting said second transaction is permitted to be conveyed via said second port comprises comparing said second mask to a domain vector register of said second port.

31. The system of claim 30, wherein detecting said first transaction is permitted to be conveyed via said first port further comprises determining said domain vector register of said first port has a bit set which corresponds to a bit set in said first mask, and wherein said detecting said second transaction is permitted to be conveyed via said second port further comprises determining said domain vector register of said second port has a bit set which corresponds to a bit set in said second mask.

32. The system of claim 31, wherein said switch is configured to determine said first and second arbitration domain by querying a lookup table.

33. The system of claim 28, wherein a first port of said switch is coupled to said first domain and is not coupled to said second domain, and a second port of said switch is coupled to said first domain and said second domain, wherein said switch is configured to serialize said first and second transaction by:

conveying said first transaction to said first port and said second port concurrently; and conveying said second transaction to said first port and said second port concurrently, wherein said second transaction is conveyed to said first port and said second port subsequent to conveying said first transaction to said first port and said second port.

34. The system of claim 33, wherein subsequent to said conveying said first transaction to said first port and said conveying said second transaction to said second port, said switch is further configured to:

transmit said first transaction via said first port in response to detecting said first transaction is permitted to be transmitted via said first port;

transmit said first transaction via said second port in response to detecting said first transaction is permitted to be transmitted via said second port;

transmit said second transaction via said first port in response to detecting said second transaction is permitted to be transmitted via said first port; and transmit said second transaction via said second port in response to detecting said second transaction is permitted to be transmitted via said second port.

35. The system of claim 34, wherein detecting said first transaction is permitted to be conveyed via said first port comprises comparing said first mask to a domain vector register of said first port, and wherein detecting said first transaction is permitted to be conveyed via said second port comprises comparing said first mask to a domain vector register of said second port, and wherein detecting said second transaction is permitted to be conveyed via said first port comprises comparing said second mask to a domain vector register of said first port, and wherein detecting said second transaction is permitted to be conveyed via said second port comprises comparing said second mask to a domain vector register of said second port.

36. The system of claim 35, wherein detecting said first transaction is permitted to be conveyed via said first port further comprises determining said domain vector register of said first port has a bit set which corresponds to a bit set in said first mask, and wherein detecting said first transaction is permitted to be conveyed via said second port further comprises determining said domain vector register of said second port has a bit set which corresponds to a bit set in said first mask, and wherein said detecting said second transaction is permitted to be conveyed via said second port further comprises determining said domain vector register of said second port has a bit set which corresponds to a bit set in said second mask, and wherein said detecting said second transaction is permitted to be conveyed via said first port further comprises determining said domain vector register of said first port has a bit set which corresponds to a bit set in said second mask.

37. The system of claim 34, further comprising:

inhibiting transmission of said first transaction via said first port in response to detecting said first transaction is not permitted to be transmitted via said first port;

inhibiting transmission of said first transaction via said second port in response to detecting said first transaction is not permitted to be transmitted via said second port;

inhibiting transmission of said second transaction via said first port in response to detecting said second transaction is not permitted to be transmitted via said first port; and inhibiting transmission of said second transaction via said second port in response to detecting said second transaction is not permitted to be transmitted via said second port.

38. The system of claim 37, wherein said switch is configured to determine said first and second arbitration domain by querying a lookup table.

* * * * *

UNITED STATES PATENT AND TRADEMARK OFFICE
CERTIFICATE OF CORRECTION

| | |
|---|---|
| PATENT NO. | : 7,020,146 B2 |
| APPLICATION NO. | : 09/943566 |
| DATED | : March 28, 2006 |
| INVENTOR(S) | : Smith et al. |

It is certified that error appears in the above-identified patent and that said Letters Patent is hereby corrected as shown below:

TITLE PAGE, ITEM (73) INVENTORS:

Please delete "Brian L. Smith, Sunnyvale, CA. (US); Wayne Seltzer, San Jose, CA (US); Andrew Clayton, Redwood City CA (US)" and substitute --Brian L. Smith, Sunnyvale, CA. (US); Wayne Seltzer, San Jose, CA (US); William Andrew Clayton, Redwood City CA (US)--

Signed and Sealed this

Twenty-fifth Day of July, 2006

JON W. DUDAS
*Director of the United States Patent and Trademark Office*